United States Patent [19]

Matsuno et al.

[11] Patent Number: 4,559,431
[45] Date of Patent: Dec. 17, 1985

[54] APPARATUS FOR PRODUCING WELDED METALLIC CAN BODIES

[75] Inventors: Kenji Matsuno; Kazuma Kuse, both of Yokohama, Japan

[73] Assignee: Toyo Seikan Kaisha Limited, Tokyo, Japan

[21] Appl. No.: 594,294

[22] Filed: Mar. 28, 1984

[30] Foreign Application Priority Data

Mar. 30, 1983 [JP] Japan .................................. 58-52670
May 19, 1983 [JP] Japan .................................. 58-86538

[51] Int. Cl.⁴ .............................................. B23K 11/08
[52] U.S. Cl. ......................................... 219/64; 219/84
[58] Field of Search ....................... 219/64, 67, 83, 84, 219/119, 112

[56] References Cited

U.S. PATENT DOCUMENTS 2,204,549  6/1940  Murch .................................... 219/83
2,280,111  4/1942  Widell .................................... 219/64
4,334,138  6/1982  Matsuno et al. ....................... 219/64

OTHER PUBLICATIONS

Applegate, Ray, "Resistance Seam Welding Automobile Gas Tanks", The Welding Journal (Nov. 1934), pp. 16-18.

Primary Examiner—C. L. Albritton
Assistant Examiner—Catherine M. Sigda
Attorney, Agent, or Firm—Wenderoth, Lind & Ponack

[57] ABSTRACT

An improved apparatus for producing welded metallic can bodies is provided. The apparatus has two roll-like revolving electrodes and an elongate electrode, and the lap portions of two can bodies are disposed respectively between the two revolving electrodes and the elongate electrode. An alternating current flowing through these lap portions is supplied by coupling the two revolving electrodes to an ac power supply, or by dividing the elongate electrode into two electrically insulated portions and coupling these portions to the power supply.

9 Claims, 12 Drawing Figures

APPARATUS FOR PRODUCING WELDED METALLIC CAN BODIES

BACKGROUND OF THE INVENTION

1. Field of the Invention

This invention relates to an apparatus for producing welded metallic can bodies, and particularly, to an apparatus comprising roll-like revolving electrodes and a linear elongate electrode for producing welded metallic can bodies by mash seam resistance welding.

More specifically, this invention pertains to an apparatus for producing welded metallic can bodies, which comprises two revolving electrodes and an elongate electrode, and in which the lap portions of can bodies are adapted to be disposed respectively between the two revolving electrodes and the elongate electrode, and an alternating current flowing in these lap portions is supplied by coupling the two revolving electrodes to a power supply or by dividing the elongate electrode into two electrically insulated portions and coupling them to the power supply.

The "revolving electrode", as used herein, denotes a type of electrode which rotates while moving in a predetermined direction. It should be understood therefore that the terms "revolving" as a qualifier and "revolve" as a verb are used in this sense in the present specification and the appended claims.

2. Description of the Prior Art

An apparatus for seam-welding the lap portion of a can body by inserting it between a pair of rotating roller electrodes disposed at fixed positions and applying an alternating current across the electrodes while moving the lap portion has been widely known for the production of welded metallic can bodies of cans for holding aerosols, beer, powdery coffee, etc. and 18-liter cans. An apparatus comprising a roll-like revolving electrode and a linear elongate electrode has also been known widely. It is also well known that to avoid wear of the electrodes, seam welding is carried out while a wire-like electrode is interposed between the lap portion of the can body and the electrode.

In a general apparatus for the production of a welded metallic can body using a revolving electrode and an elongate electrode, a can body is disposed so as to surround the elongate electrode provided fixedly, and a high-frequency voltage is applied across the elongate electrode and the revolving electrode. The revolving electrode moves with rotation. As a result, the lap portion of the can body is successively pressed by the elongate electrode and the revolving electrode, and a high-frequency current is passed through the lap portion, thereby welding the lap portion.

The conventional apparatus, however, has the following problems.

To increase the speed of production, it is necessary to increase the speed of welding, i.e. the revolving speed of the revolving electrode. For increasing the speed of welding and performing welding satisfactorily, it is necessary to increase the frequency of the current from an ac power supply to about 200 to 500 Hz. This in turn gives rise to the following problems. Firstly, flowing of the current becomes difficult. An ac current with an rms of 3 to 9 KA is required. This increase in frequency, however, results in difficulty in the flowing of the current. It is believed to be due mainly to the increase of the inductance L in the impedance Z. The magnitude of inductance L is markedly affected by the degree of opening of an electrical circuit on the secondary side of a transformer. The value of the inductance L becomes larger as the degree of opening of the electrical circuit becomes larger. For example, if the distance between two electrical paths from an ac power supply to the welding portion is large, the value of the inductance L becomes high. On the other hand, in the conventional apparatus described above, one of the electrical paths from the ac power supply to the welding portion is made up of a conductor leading up to the elongate electrode, and the other is a feeder leading to the revolving electrode. The revolving electrode moves relative to the elongate electrode. Accordingly, the two electrical paths cannot be caused to approach and the inductance L cannot be reduced. A second problem concerns the generation of heat at various parts. When a welding current having a relatively high frequency of about 200 to 500 Hz is used and, for example, a conductor exists in the secondary side circuit of the transformer, an eddy current occurs in the conductor to generate heat. This heat generation is particularly great in a magnetic material such as iron. In the prior art, therefore, it is necessary to limit the materials constituting various component parts, or a complex mechanism should be provided to cool these component parts.

SUMMARY OF THE INVENTION

It is an object of this invention to provide an apparatus for producing welded metallic can bodies, in which two electrical paths to a welding zone approximate each other, and therefore the restriction on the materials constituting these parts can be removed and the cooling mechanism can be markedly reduced in size as compared with the conventional apparatus.

Another object of this invention is to provide an apparatus for producing welded metallic can bodies, which permits production speeds at least two times as fast as in the conventional apparatuses.

Still another object of this invention is to provide an apparatus for producing welded metallic can bodies which can produce metallic can bodies of a small inside diameter.

The above and other objects of this invention are achieved in accordance with this invention by an apparatus for producing a welded metallic can body by welding the lap portion of a metallic can body, said apparatus comprising an elongate electrode having an electrode surface of a shape corresponding to the shape of the lap portion of a can body, two revolving electrodes adapted to revolve on the lap portions of two can bodies disposed on the electrode surface of the elongate electrode while pressing said lap portions, means for revolving the two revolving electrodes on the lap portions of said can bodies, and feeder means for electrically coupling the two revolving electrodes respectively to an ac power supply, whereby when the two revolving electrodes are revolving on the lap portions of the two can bodies, one terminal of the ac power supply is electrically coupled to the other terminal of the ac power supply via the feeder means, one revolving electrode, the lap portion of one can body, the elongate electrode, the lap portion of the other can body, the other revolving electrode and again the feeder means.

According to another aspect of this invention, the above and other objects are achieved by an apparatus for producing welded metallic can bodies by welding the lap portions of metallic can bodies, said apparatus comprising an elongate electrode having two electrode surfaces of a shape corresponding to the shape of the lap portions of the can bodies, two revolving electrodes adapted to revolve on the lap portions of two can bodies disposed on the two electrode surfaces of the elongate electrode while pressing said lap portions, and means for revolving the two revolving electrodes at the lap portions of the can bodies, said elongate electrode having two conductors electrically insulated from each other and electrically coupling the two electrode surfaces of the elongate electrode to an ac power supply, and said two revolving electrodes being electrically coupled to each other, whereby when the two revolving eletrodes are revolving on the lap portions of the two can bodies, one terminal of the ac power supply is electrically coupled to the other terminal of the ac power supply through one conductor and one electrode surface of the elongate electrode, one can body, one revolving eletrode, the other revolving electrode, the other can body, and the other electrode surface and the other conductor of the elongate electrode.

BRIEF DESCRIPTION OF THE ACCOMPANYING DRAWINGS

The above and other objects of the invention are accomplished by the novel features of the present invention which will become apparent from the following description having reference to the accompanying drawings in which.

DETAILED DESCRIPTION OF PREFERRED EMBODIMENTS

First, with reference to FIGS. 1 and 2, a conventional apparatus for producing a welded metallic can body using a revolving electrode and an elongated electrode will be described.

Figure 1:
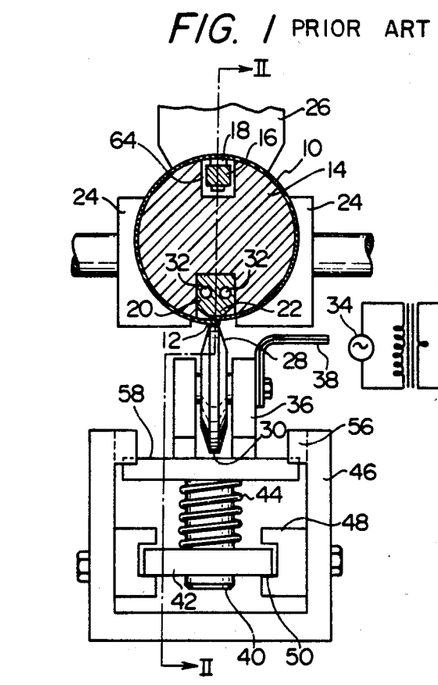
FIG. 1 is a partial sectional front elevation of a conventional apparatus for producing a welded metallic can body.
Figure 2:
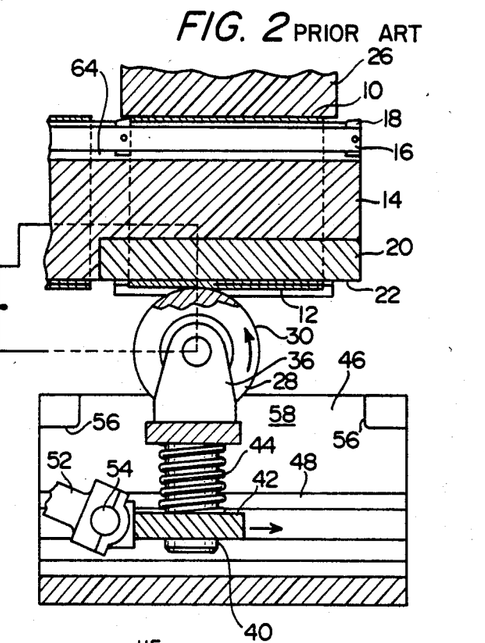
FIG. 2 is a sectional view taken along line II—II of FIG. 1.

FIG. 1 is a partially cut-away front elevation showing the welding electrode portion of the conventional apparatus and its neighborhood, and FIG. 2 is a partially cut-away side elevation taken along line II—II of FIG. 1.

An unwelded can body is shown at 10. It is fabricated by a can body maker (not shown) on the left side of FIG. 2 so that its lap portion 12 is directed downwardly. The can body maker is installed at the left end of a mandrel 14, and the lap, or overlapped portion is welded at the right end of the mandrel 14. The can body 10 is conveyed from left to right over the mandrel 14. A can body feeding rod 16 is inserted in a long channel 64 at the top portion of the mandrel 14. A plurality of claws 18 are provided on the feeding rod 16 at fixed intervals. When the feeding rod 16 moves to the right, the top portion of the rear end of the can body 10 engages the claws 18 and consequently the can body 10 is conveyed. The claws 18 are constructed such that they descend when pressed from above, and are returned to their original positions by a spring when the pressure is released. An elongate electrode 20 is disposed within a bottom channel at the right end portion of the mandrel 14. The elongate electrode 20 is composed of an elongate copper or copper alloy having a larger length than the length of the lap portion 12 (i.e., the height of the can body) at least at its electrode surface 22. The electrode surface 22 is a flat surface corresponding to the shape of the lap portion 12, or has a convex shape in the widthwise direction (the left-right direction in FIG. 1). When the lap portion 12 of the can body 10 is not linear as in the case of a barrel-like can body, the electrode surface 22 has a curved surface corresponding to the shape of the lap portion in the longitudinal direction. The width of the electrode surface 22 is larger than the width of the lap portion 12. Usually, the electrode surface 22 exists on a plane extending from the mandrel 14. Within the elongate electrode 20 is provided a cooling hole 32 for passing cooling water, brine (for example, at −30° C.), liquefied Freon, etc. therethrough so as to cool the surface of the can body welded portion sufficiently and thus prevent oxidation of such a part and wearing of the electrodes. The elongate electrode 20 is coupled to an ac power supply 34 (for example, having a commercial frequency, or a frequency of about 200 to about 500 Hz in the case of high-speed can making) by a feeder (not shown).

A pair of holding wings 24 are disposed on the opposite sides of the electrode portion of the mandrel 14, and a supporting member 26 is disposed on the top of the mandrel 14. The holding wings 24 and the supporting member 26 can be moved laterally and vertically by a cam mechanism (not shown) which is in a synchronous relation to a driving mechanism for the feeding rod 16. Hence, prior to welding, these members can press the can body 10 against the mandrel 14 and fix it there.

Beneath the elongate electrode 20 is disposed a revolving electrode 28. The revolving electrode 28 in the illustrated apparatus is disc-like and its electrode surface 30 is in the form of a short hollow cylinder. The width of the electrode surface 30 is larger than the width of the lap portion 12. The revolving electrode 28 is supported by a bearing stand 36 through bearings and coupled to an ac power supply by a feeder 38. A supporting rod 40 is fixed to the bottom portion of the bearing stand 36, and the lower portion of the supporting rod 40 is slidably fitted in an aperture formed in a sliding plate 42. The bearing stand 36 is movable vertically with respect to the sliding plate 42. A pressing spring 44 surrounding the supporting rod 40 is provided between the lower surface of the bearing stand 36 and the upper surface of the supporting rod 40. At the time of welding, a pressure is applied to the lap portion 12 by means of the pressing spring 44. Both side portions of the sliding plate 42 slide longitudinally of the mandrel 14 along guide surfaces 50 of guides 48 provided horizontally on the side inner surfaces of a supporting frame 46, and incident to this, the revolving electrode 28 revolves, or more specifically moves with rotation on the lap portion 12. Sliding of the sliding plate 42 is effected by rotating a rotating disc (not shown) through a pin 54 connecting the the sliding plate 42 to one end of a linking rod 52 with its other end being secured eccentrically to the rotating disc. Projecting portions (engaging portions) 56 are provided respectively on the inner upper end portions of both side plates of the supporting frame 46. When the upper surface of a bottom plate 58 of the bearing stand engages the lower surfaces of the projecting portions 56, the revolving electrode 28 is lowered to make the distance between the top surface of the revolving electrode 28 and the electrode surface of the elongate electrode 20 larger than the thickness of the lap portion or the welded portion. Hence, the revolving electrode 28 is prevented from hampering the feeding of the can body 10 into the electrode portion and the delivering of the welded can body.

By the apparatus described above, the can body is welded by the following procedure.

The unwelded can body 10 is sent to a predetermined position of the elongate electrode 20 by the feeding rod 16 and stopped there when the revolving electrode 28 is at the left end side (FIG. 2) of the supporting frame 46, the left projecting portion 56 is in engagement with the upper surface of the bottom plate 58 of the bearing stand 36, and the distance between the top surface of the revolving electrode 28 and the electrode surface 22 of the elongate electrode 20 is larger than the thickness of the lap portion. Simultaneously, the pair of holding wings 24 advance toward the mandrel 14 from left and right, and the supporting member 26 from above, thereby pressing the can body 10 against the mandrel 14 and fixing it there. It is important that the entire width of the lap portion 12 should contact the electrode surfaces 22 and 30 in this fixed state. This is for the purpose of mashing the entire lap portion 12 and reducing the thickness of the entire weld portion uniformly. If any part in the widthwise direction of the lap portion 12 is kept out of contact, this part is not mashed, and leaves a stepped portion corresponding to the thickness of the can blank. To achieve corrosion resistance by completely covering this stepped portion, a large amount of a protective lacquer is required.

Then, the sliding plate 42 moves to the right to disengage the upper surface of the bottom plate 58 of the bearing stand 36 from the left projecting portion 56. The electrode surface 30 of the revolving electrode 28 rotates on the electrode surface 22 of the elongated electrode 20 and moves to the right with rotation while pressing the lap portion 12 by the pressing spring 44. In the meantime, an electric current passes through the revolving electrode, the lap portion and the elongate electrode, and the lap portion is welded. Usually, when the revolving speed (i.e., the welding speed) is less than about 20 m/min., an alternating current having a frequency of 50 to 60 Hz is used. For higher welding speeds, an alternating current of a higher frequency is used.

Alternating currents of various frequencies or wave forms may be applied.

The conventional apparatus, however, has the disadvantage that the flowing of the current becomes difficult, and the various parts of the apparatus generate heat.

Now, with reference to FIG. 3, a first embodiment of the apparatus of this invention will be described.

The apparatus for producing welded metallic can bodies in accordance with the first embodiment of the invention includes a fixed elongate electrode 120, a can body moving means 115, two revolving electrodes 128 and 129, a supporting means for supporting the two revolving electrodes 128 and 129, a revolving electrode moving means (not shown) and an ac power supply 134.

Figure 3:
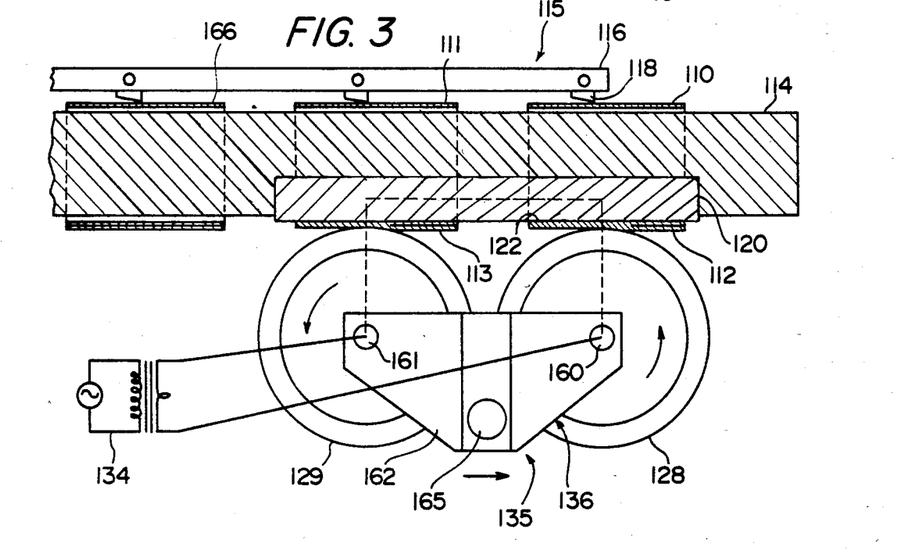
FIG. 3 is a partial sectional side elevation of one embodiment of the apparatus of this invention.

The fixed elongate electrode 120 is constructed as part of a mandrel 114, and a can body maker (not shown) is provided at the left side portion in FIG. 3 of the mandrel 114. At least that portion of the mandrel 114 which constitutes the fixed elongate electrode 120 is formed of a conductor. A can body fixing device (not shown) cooperating with the mandrel 114 is provided so as to set the can body fixedly at a first position, a second position, etc. on the mandrel 114. In FIG. 3, a first unwelded can body 110 is set at the first position and a second unwelded can body 111, at the second position. The can body fixing device may, for example, be holding wings and a supporting member as shown in FIGS. 1 and 2. The can bodies 110 and 111 are set such that when they are at the first and second positions, their lap portions 112 and 113 are located downwardly thereof in FIG. 3. An electrode surface, 122 similar to the electrode surface 22 shown in FIGS. 1 and 2, is formed at the lower end (FIG. 3) of the fixed elongate electrode 120.

The can body moving means 115 has a can body feeding rod 116 and a plurality of claws 118. The feeding rod 116 and the claws 118 have the same structure and function as the feeding rod 16 and the claws 18 in FIGS. 1 and 2. Specifically, the plurality of claws 118 are arranged on the feeding rod 116 at fixed intervals, and adapted to rise when pressed from below and elastically return to their original positions when released from pressure. Accordingly, the can bodies can be successively moved to the right in FIG. 3 by reciprocating the feeding rod 116 in the left-right direction in FIG. 3 and fixedly setting it intermittently at predetermined positions.

The two revolving electrodes 128 and 129 are disposed below the fixed elongate electrode. These revolving electrodes 128 and 129 are constructed in the same way as the revolving electrode 28 shown in FIGS. 1 and 2. In the illustrated embodiment, the revolving electrodes 128 and 129 are disc-like. Their shape, however, is not limited to this specific one, and may, for example, be a nearly fan-like shape. Generally, the revolving electrodes 128 and 129 have a radius of curvature of at least 40 mm. When can bodies are made of tin-free steel, these revolving electrodes preferably have a radius of curvature of at least 50 mm.

The supporting device 135 has a bearing stand 136 for rotatably supporting shafts 160 and 161 of the revolving electrodes 128 and 129, respectively. The bearing stand 136 includes, for example, two bearing plates 162 and a supporting rod 165 for supporting the bearing plates 162 fixedly and parallel to each other. The revolving electrodes 128 and 129 and the shafts 160 and 161 are formed, for example, of metal as an integral unit respectively and are electricaly coupled to each other. However, a bearing (not shown) of the bearing plate 167 supporting the shaft 160 is electrically insulated from a bearing of the bearing plate 162 supporting the shaft 161, and therefore, the shaft 160 is electrically insulated from the shaft 161.

The revolving electrode moving means (not shown) is connected to the bearing stand 136 so that the two revolving electrodes 128 and 129 can move toward and away from the electrode surface 122 of the fixed elongate electrode 120 and longitudinally of the fixed elongate electrode 120, i.e. in the left-right direction in FIG. 3. The revolving electrode moving means can be constructed, for example, of members similar to the supporting rod 40, the sliding plate 42, the pressing spring 44, the supporting frame 46, the guides 48, the linking rod 52, the pin 54, and the projecting portion 56 shown in FIGS. 1 and 2.

The shafts 160 and 161 of the revolving electrodes 128 and 129 are connected respectively to the ac power supply 134. When the circuit is closed, one terminal of the ac power supply 134 is electrically coupled to the other terminal of the ac power supply 134 via the first shaft 160, the first revolving electrode 128, the lap portion 112 of the first can body 110, the elongate electrode 120, the lap portion 113 of the second can body 111, the second revolving electrode 129 and the second shaft 161. Preferably, the current flowing in this circuit is an ac current having a rms value of 3 to 9 KA with a frequency of 200 to 500 Hz. The ac power supply 134 can be electrically coupled with the shafts 160 and 161 by using, for example, a feeder bearing which is adapted to electrically couple a member rotating while holding a conductive liquid such as mercury sealed therein to a non-rotatable member continuously.

The operation of the apparatus in accordance with the first embodiment shown in FIG. 3 will be described.

A thin can body blank, for example a tin-free steel plate (electrolytically chromate-treated steel plate), a tin plate or a nickel-plated steel plate having a thickness of 0.12 to 0.60 mm, preferably 0.15 to 0.40 mm is fed to a can body maker (not shown) disposed at the left side portion in FIG. 3. By the can body maker, the metal blank is fabricated into a cylindrical form with the width of the lap portion being 0.1 to 1.0 mm, preferably 0.2 to 0.8 mm.

Can bodies so made are successively conveyed from left to right in FIG. 3 by the can body moving means 115 comprised of the feeding rod 116 and the claws 118. When the feeding rod 116 moves from left to right, a first, a second and a third can body 110, 111 and 166 can freely move over the elongate electrode 120. By engagement of the claws 118 with the left ends of the can bodies 110, 111 and 166, respectively, these can bodies are moved to the right. The amount of movement corresponds to the distance from the the third position (i.e., the position at the left end portion of FIG. 3) at which the third can body 166 is located in FIG. 3 to the first position at which the first can body 110 is located in FIG. 3. When the feeding rod 116 moves from right to left, the can bodies 110, 111 and 166 are set fixedly to the elongate electrode 120 by the can body fixing device (not shown). Thus, when the feeding rod 116 moves from right to left, the claws 118 are lifted by the can bodies 110, 111 and 166 and slide over the upper surfaces of the can bodies 110, 111 and 166. After the above movement, the can body fixing device (not shown) fixedly sets the first can body 110 at the first position, the second can body 111 at the second position, and the third can body 166 at the third position.

Thereafter, by the revolving electrode moving means (not shown), the revolving electrodes 128 and 129 are moved to such positions that the upper end of the first revolving electrode 128 (FIG. 3) stands in proximity to the electrode surface 122 of the fixed elongate electrode 120 and slightly on the left of the left side end of the first can body 110 (FIG. 3) fixed as above, and the upper end of the second revolving electrode 129 (FIG. 3) stands in proximity to the electrode surface 122 of the fixed elongate electrode 120 and slightly left of the left side end of the second can body 111 (FIG. 3) fixed as above. As a result, one terminale of the power supply 134 is electrically coupled to the other terminal via the first shaft 160, the first revolving electrode 128, the elongate electrode 120, the second revolving electrode 129 and the second shaft 161. Then, the first and second revolving electrodes 128 and 129 are moved to the right in FIG. 3.

This movement first electrically couples the left side end of the first can body 110 to the first revolving electrode 128, and simultaneously, the left side end of the second can body 111 to the second revolving electrode 129. The first and second revolving electrodes 128 and 129 revolve on the lap portions 112 and 113 respectively. Consequently, one terminal of the ac power supply 134 is electrically coupled to the other terminal via the shaft 160 of the first revolving electrode 128, the first revolving electrode 128, the lap portion 112 of the first can body 110, the elongate electrode 120, the lap portion 113 of the second can body 111, the second revolving electrode 129 and the shaft 161 of the second revolving electrode 129. An ac voltage may be intermittently applied by the opening and closing of a switch (not shown). Application of the ac voltage is usually started slightly before the first and second revolving electrodes 128 and 129 reach the left side ends of the first and second can bodies 110 and 111 and contact them. When the circuit is closed, an ac current having a rms value of 3 to 9 KA with 200 to 500 Hz flows through the circuit.

When the first and second revolving electrodes 128 and 129 further move to the right in FIG. 3, the distances from the tops of the first and second revolving electrodes 128 and 129 to the electrode surface 122 of the elongate electrode 120 become smaller than the thicknesses of the lap portions 112 and 113 of the can bodies 110 and 111, respectively. Hence, the first and second revolving elecrodes 128 and 129 revolve while pressing the lap portions 112 and 113. The welding force so applied is generally 30 to 500 kg, preferably 40 to 200 kg. The speed of movement of the revolving electrodes 128 and 129 to the right in FIG. 3 is 30 to 70 m/min.

When the first and second revolving electrodes 128 and 129 further move to the right, the tops of the first and second revolving electrodes 128 and 129 reach the right side ends of the can bodies 110 and 111 respectively and then move away therefrom. The moment the revolving electrodes 128 and 129 leave the right side ends of the can bodies 110 and 111, the applied ac current is cut off by a switch (not shown).

Then, the can body fixing device is rendered inoperative, and the welded can bodies are moved a predetermined distance to the right in FIG. 3 by the feeding rod 116 and the claws 118. Consequently, the first and second welded can bodies 110 and 111 are removed from the right end of the mandrel 114, and the third unwelded can body 166 moves to the first position previously occupied by the first can body 110. A fourth unwelded can body (not shown) located to the left of the third can body 166 is moved to the second position previously occupied by the second can body 111.

Thereafter, by the procedure described above, the other unwelded can bodies are fixed to the elongate electrode 120, and their lap portions are welded.

In the illustrated embodiment, the revolving electrodes 128 and 129 move to the right in FIG. 3 with rotation during welding. It is possible however to move them alternately to the right and to the left with rotation during the welding operation.

In the apparatus in accordance with this invention, it is not necessary to pass an electric current through the mandrel. The shape and material of that portion of the mandrel which leads to the welding zone can be more freely chosen than in the conventional apparatus. Accordingly, it is easy to fabricate and weld metallic can bodies having a small inside diameter.

Now, with reference to FIG. 4, a second embodiment of the apparatus of this invention will be described.

Figure 4:
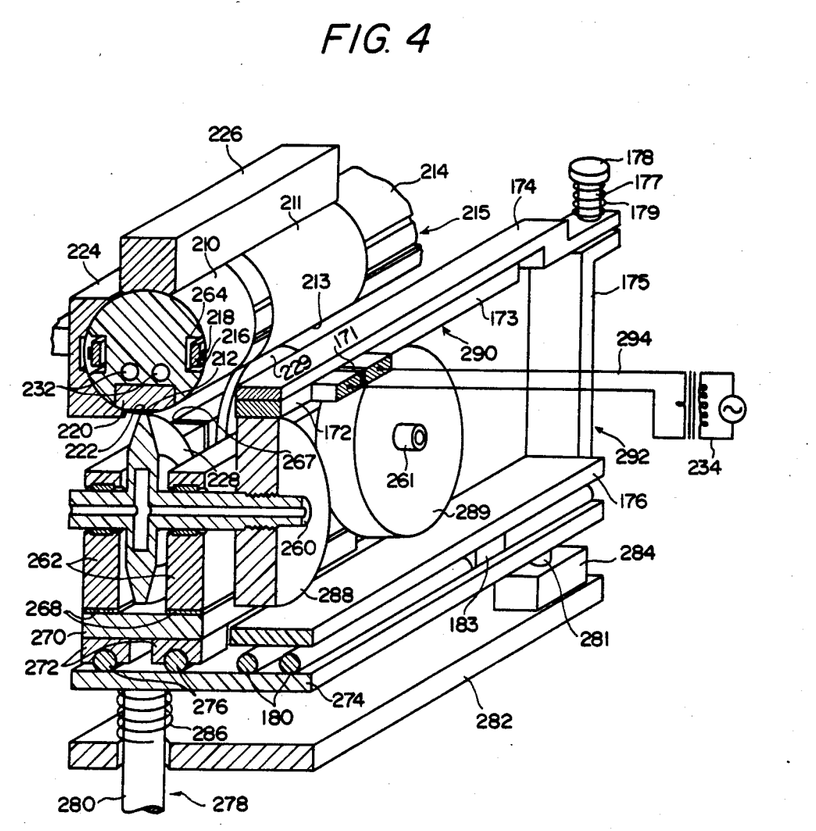
FIG. 4 is a partial sectional perspective view of a second embodiment of the apparatus of this invention.

The apparatus shown in FIG. 4 includes a mandrel 214, a can body moving means 215, holding wings 224, a supporting member 226, etc. which are similar to those shown in FIGS. 1 to 3 but are slightly modified.

The mandrel 214 has cooling holes 232 extending therethrough so that a cooling liquid such as cooling water, brine (for example at −30° C.) or liquefied Freon can be passed through it to cool an elongate electrode 220, can bodies 210 and 211, and other parts sufficiently and thereby to prevent oxidation and damage of these parts.

The can body moving means 215 of the apparatus shown in FIG. 4 includes a can body feeding rod 216 disposed in each of long channels 264 formed on both side portions of the mandrel 214 and a plurality of claws 218 formed on the feeding rod 216, and functions in the same way as the can body moving means shown in FIGS. 1 to 3.

Revolving electrodes 228 and 229 are formed as a unit with revolving electrode shafts 260 and 261, respectively, and the shafts 260 and 261 are rotatably supported on two bearing plates 262. Each of the bearing plates 262 divided into a portion supporting the first shaft 260 and a portion supporting the second shaft 261 which are electrically isolated from each other by a first insulator 267. The two bearing plates 262 are fixed to the upper surface of a supporting stand 270 via a second insulator 268. As a result, the first revolving electrode 228 and the second revolving electrode 229 are not electrically coupled through the bearing plates. Two rail receiving members 272 are fixed to the under surface of the supporting stand 270, and two rails 276 fixed to a base stand 274 are received by the rail receiving members 272. The rail receiving members 272 can move in the longitudinal direction with respect to the rails 276, but cannot move in other directions. The base stand 274 makes a controlled reciprocating motion in the vertical direction by a driving mechanism 278. The driving mechanism 278 is comprised of two rods 280 and 281 fixed to the base stand 274 and extending vertically, a sliding supporting portion 284 fixed to a fixedly disposed frame 282, and a spring 286. The rod 281 is adapted to move only in the vertical direction within the sliding supporting portion 284. As a result, during the vertical movement, the base stand 274 is maintained horizontal. The spring 286 is disposed around the other rod 280 and between the base stand 274 and the frame 282, and always urges the base stand 274 upwardly. The lower ends of the two rods 280 and 281 are connected to a cam mechanism (not shown) so that the base stand 274 can make a controlled reciprocating motion vertically.

When the base stand 274 is lifted by the cam mechanism, the revolving electrodes 228 and 229 are brought into press contact with the elongate electrode 220 through the lap portions 212 and 213 of the can bodies 210 and 211 by the urging force of the spring 286. On the other hand, the supporting stand 270 is caused to make a controlled reciprocating motion longitudinally along the rails 276 by a driving mechanism not shown.

In the apparatus of FIG. 4, a power supply 234 is electrically coupled to the revolving electrodes 228 and 229 by a feeder device to be described.

The feeder device includes feeder rotors 288 and 289, a feeder plate 290 and a feeder plate supporting member 292. The feeder rotors 288 are made of a material having a low electrical resistance, such as copper or a copper alloy, and are fixed respectively to the shafts 260 and 261. The feeder plate 290 has a first portion 172 and a second portion 173 which are electrically isolated from each other by an insulating portion 171. The feeder plate 290 is always urged downwardly as described below, whereby the feeder rotors 288 and 289 are electrically coupled to the first portion 172 and the second portion 173. The first portion 172 and the second portion 173 of the feeder plate 290 are connected to the power supply 234 through a flexible feeder 294.

The feeder plate supporting member 292 has a top plate 174, two side plates 175 (only one of which is shown), and a bottom plate 176, and is rectangular on the whole. The top plate 174 is formed of an insulator and fixedly supports the feeder plate 290. The side plate 175 is fixedly set on the bottom plate 176. An upwardly extending rod 177 is provided at the top surface of the side plate 175, and a projecting portion 178 is formed at the upper end of the rod 177. The rod 177 extends through a hole formed at the end portion of the top plate 174 so that the top plate 174 can move vertically with respect to the side plate 175. A compression spring 179 always urging the top plate 174 downwardly is disposed around the rod 177 and between the projecting portion 178 of the rod 177 and the top plate 174. FIG. 4 shows only the right side plate 175, but the left side plate 175 and other members attached thereto are constructed in the same way as described above. Four rail receiving members 183 (only one of which is shown in the drawing) are secured fixedly to the under surface of the bottom plate 176. Two rail receiving members 183 receive each of two rails 180 fixed to the base stand 274. As a result, the feeder plate supporting member 292 can move longitudinally of the rail 180 parallel to the longitudinal direction of the elongate electrode 220, but cannot move in other directions, with respect to the base stand 274.

The operation of the apparatus in accordance with the second embodiment of the invention described above will be described.

In this apparatus, the right rear portion of the mandrel 214 in FIG. 4 constitutes a can body maker (not shown) which fabricates a thin metal blank into can bodies. Can bodies so produced are successively moved forwardly to the left by the feeding rod 216 and the claws 218, and fixed at predetermined positions by the holding wings 224 and the supporting member 226. The revolving electrodes 228 and 229 are positioned such that their top portions stand respectively at longitudinal positions slightly on the left of the left ends of the first can body 210 and the second can body 211 fixed at predetermined positions as stated above and at vertical positions slightly below the lap portions 212 and 213 of the can bodies 210 and 211. In this state, the first feeder rotor 288 is in press contact with the first portion 172 of the feeder plate 290, and the second feeder rotor 289, with the second portion 173 of the feeder plate 290.

Then, the base stand 274 is moved upwardly by the driving mechanism 278, and the top portions of the revolving electrodes 228 and 229 stand in proximity to the electrode surface 222 of the elongate electrode 220. As a result, one terminal of the ac power supply 234 is electrically coupled with the other terminal via the feeder wire 294, the first portion of the feeder plate 290, the first feeder rotor 288, the shaft 260, the first revolving electrode 228, the elongate electrode 220, the second revolving electrode 229, the shaft 261, the second feeder rotor 289, the second portion of the feeder plate 290 and again the feeder wire 294, and thus an electric current flows. At this time, the feeder rotors 288 and 289 also ascend, but since the feeder plate supporting member 292 is also provided on the base stand 274, the positions of the feeder rotors 288 and 289 relative to the feeder plate 290 remain unchanged.

Then, the supporting stand 270 supporting the revolving electrodes is moved rearwardly to the right along the rails 276 by a driving mechanism. As a result, the revolving electrodes 228 and 229 move with rotation while standing in proximity to the elongate electrode 220, and the feeder rotors 288 and 289 move with rotation while standing in proximity to the feeder plate 290.

When the revolving electrodes 228 and 229 and the feeder rotors 288 and 289 are further moved, the revolving electrodes 228 and 229 contact the left front ends of the can bodies 210 and 211. Consequently, one terminal of the ac power supply 234 is electrically coupled to the other terminal of the ac power supply 234 via the feeder 294, the first portion 172 of the feeder plate 290, the first feeder rotor 288, the shaft 260, the first revolving electrode 228, the lap portion 212 of the first can body 210, the elongate electrode 220, the lap portion 213 of the second can body 211, the second revolving electrode 229, the shaft 261, the second feeder rotor 289, the second portion 173 of the feeder plate 290 and again the feeder 294. Thus, an electric current flows and welding of the lap portions 212 and 213 is started.

On further movement, the first revolving electrode 228 moves with rotation while being in contact with the lap portion 212 of the first can body; the second revolving electrode 229, while being in contact with the lap portion 213 of the second can body 211; the first feeder rotor 288, while being in contact with the first portion 172 of the feeder plate 290; and the second feeder rotor 289, while being in contact with the second portion 173 of the feeder plate 290. As a result, the lap portion 212 of the first can body 210 and the lap portion 213 of the second can body 211 are welded.

To prevent slippage between the revolving electrodes 228 and 229 and the lap portions 212 and 213, it is necessary that the diameter of the first revolving electrode 228 should be equal to that of the second revolving electrode 229. Likewise, to prevent slippage between the feeder rotors 288 and 289 and the feeder plate 290, the diameter of the first feeder rotor 288 should be equal to that of the second feeder rotor 289.

When the diameters of the revolving electrodes 228 and 229 are equal respectively to those of the feeder rotors 288 and 289, the feeder plate 290 is kept from moving longitudinally, no slippage occurs between the revolving electrodes 228 and 229 and the lap portions 212 and 213, and between the feeder rotors 288 and 289 and the feeder plate 290, and therefore, the electrical connection is not interrupted during the welding operation. Even when the revolving electrodes and the feeder rotors are designed such that the diameters of the revolving electrodes 228 and 229 are equal to those of the feeder rotors 288 and 289, it is preferred to make the feeder plate 290 movable longitudinally by the structure shown in FIG. 4 or by simply supporting the feeder plate 290 elastically, so that no slippage occurs between the feeder rotors 288 and 289 and the feeder plate 290 over a long period of time.

On the other hand, let us assume that the radii of the revolving electrodes 228 and 229 are different from those of the feeder rotors 288 and 289. In order to avoid slippage between the feeder rotors 288 and 289 and the feeder plate 290 during movement in this case, the feeder plate 290 should be constructed such that it can be moved longitudinally.

In this case, the amount, X, of movement of the feeder plate 290 in the longitudinal direction is given by the following equation.

$$X = [(R_o - R)/R_o]S$$

wherein
$R_o$: the radius of each of revolving electrodes 228 and 229,
R: the radius of each of the feeder rotors 288 and 289,
S: the stroke of the revolving electrode in the welding direction (the longitudinal direction of the mandrel 214).

When the supporting stand 270 is moved through the stroke S in the longitudinal direction, the revolving electrodes 228 and 229 move in a straight line through the stroke S relative to the lap portions 212 and 213 respectively. During this time, the revolving electrodes 228 and 229 rotate through an angle $\omega_o (=S/R_o)$, and the feeder rotors 288 and 289 also rotate through the same angle $\omega_o (=S/R_o)$. If there is no slippage between the feeder rotors 288 and 289 and the feeder plate 290, the feeder rotors 288 and 289 and the feeder plate 290 move the distance $S' = \omega_o R$ relatively and in a straight line as a result of the aforesaid rotation. The difference X between the amount (stroke) of movement, S, of the revolving electrodes 228 and 229 relative to the lap portions 212 and 213 and the amount of movement, S', of the feeder rotors 288 and 289 relative to the feeder plate 290 is given by the following equation.

$$X = S - S' = [(R_o - R)/R_o]S$$

Accordingly, if the feeder plate 290 is moved by this difference X with respect to the lap portions 212 and 213, and therefore the feeder plate supporting member 292, with respect to the base stand 274, the feeder rotors 288 and 289 and the feeder plate 290 do not slide, and therefore, the electrical connection is not interrupted. In the feeder device shown in FIG. 4, the feeder plate supporting member 292 can freely move longitudinally of the base stand 274. Accordingly, by a frictional force between the feeder rotors 288 and 289 and the feeder plate 290, the feeder plate supporting member 292 and the feeder plate 290 are automatically moved longitudinally.

The lap portions 212 and 213 of the can bodies 210 and 211 are welded as stated above. The revolving electrodes 228 and 229 leave the right rear ends of the lap portions 212 and 213, and the welding is completed. The revolving electrodes 228 and 229 are further moved a little rearwardly to the right, and then the distance between each of the revolving electrodes 228 and 229 and the elongate electrode 220 is increased. The movement of the revolving electrodes 228 and 229 in this process is the same as the aforesaid movement before the starting of welding.

The removal of the welded can bodies 210 and 211 from the mandrel 214 and the movement of the revolving electrodes 228 and 229 can be carried out, for example, in the same way as described with regard to the embodiment shown in FIG. 3.

Preferably, in order to supply the electrical current properly, a switch (not shown) is provided between the flexible feeder 294 and the ac power supply 234. This switch is controlled such that it is turned on immediately upon or before the contacting of the revolving electrodes 228 and 229 with the lap portions 212 and 213 of the can bodies 210 and 211, and turned off as soon as, or immediately after, the revolving electrodes 228 and 229 leave the lap portions 212 and 213 after completion of the welding operation.

A third embodiment of the apparatus of this invention will be described below in detail with reference to FIGS. 5 and 6.

The third embodiment differs from the second one mainly in the use of a wire electrode, and the following description is directed mainly to this difference.

In the apparatus of the third embodiment, can bodies 310, 311 and 366 are fabricated by a can body maker (not shown) located at the left side portion of a mandrel 314, welded by an elongate electrode 320 and revolving electrodes 328 and 329, and taken out from the right end of the mandrel 314.

The can bodies 310, 311 and 366 are moved on the mandrel 314 by three sets of a combination of a can body feeding rod 316 and a claw 318, and fixed by holding wings 324 and a supporting member 326. A cooling hole 332 is formed within the mandrel 314.

The mandrel 314 includes a first guide roll 504, a lower guide channel 506, a second guide roll 508 and an upper guide channel 510 for a wire electrode 502. The wire electrode 502 is obtained, for example, by flattening a round copper or tin-plated copper wire having a diameter of about 1.5 mm. The first guide roll 504 and the second guide roll 508 are rotatably supported by the mandrel 314. The wire electrode 502 is moved a predetermined distance in the longitudinal direction by a driving mechanism (not shown) when the two revolving electrodes 328 and 329 are at positions away from the elongate electrode 320.

Figure 5:
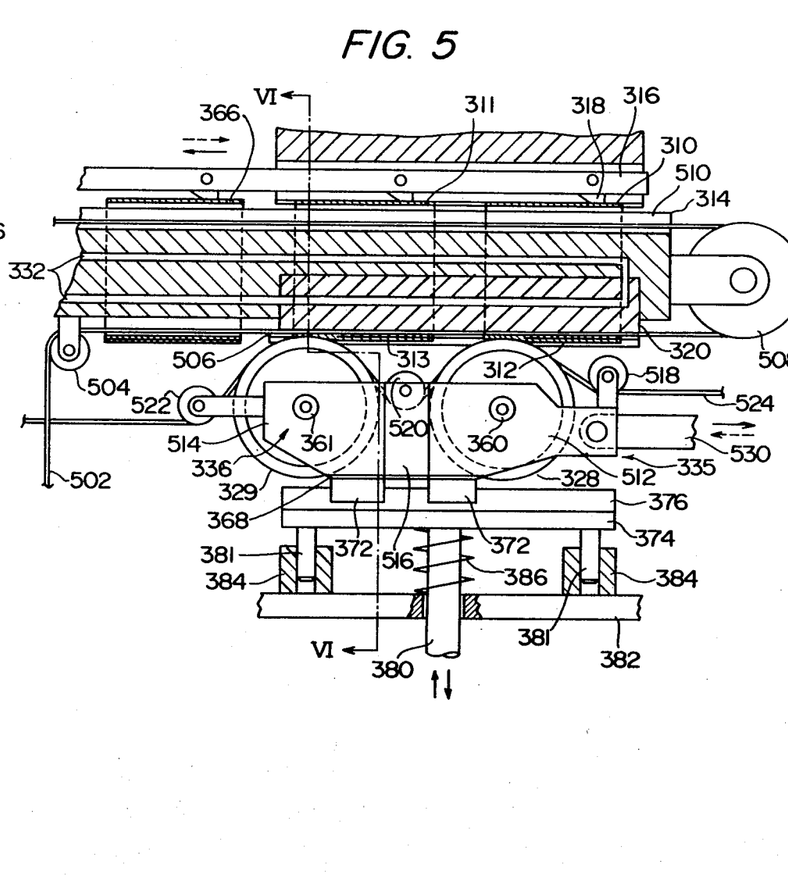
FIG. 5 is a partial sectional side elevation of a third embodiment of the apparatus of this invention.
Figure 6:
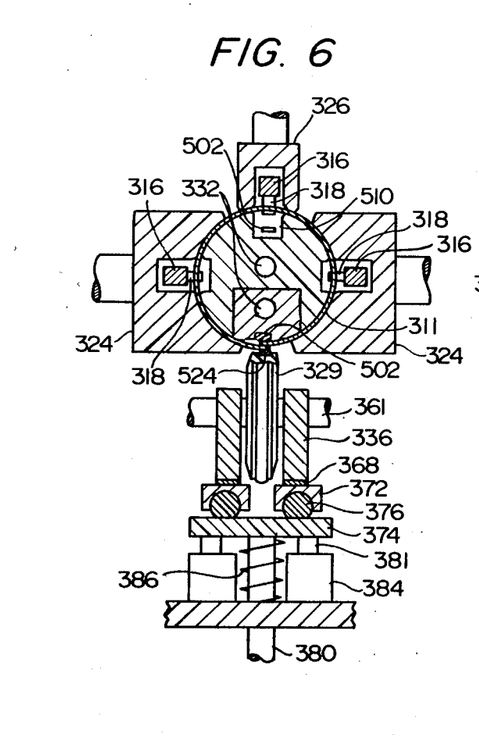
FIG. 6 is a sectional view taken along line VI—VI of FIG. 5.

As shown in FIGS. 5 and 6, a bearing stand 336 of a supporting device 335 supporting the two revolving electrodes 328 and 329 has a first portion 512 supporting the first revolving electrode 328 and a second portion 514 supporting the second revolving electrode 329 whch are insulated from each other by an insulating portion 516. A third guide roll 518 is rotatably provided on the first portion 512, and a fourth guide roll 520 is supported by a bearing on the insulating portion 516. A fifth guide roll 522 is displosed on the second portion 514. Guide channels for guiding the wire electrode 524 are formed in the revolving electrodes 328 and 329, respectively. As shown in FIG. 5, the wire electrode 524 extends via the third guide roll 518, the first revolving electrode 328, the fourth guide roll 520, the second revolving electrode 329 and the fifth guide roll 522, and is moved a predetermined amount in the longitudinal direction by a driving mechanism (not shown) when the two revolving electrodes 328 and 329 are at positions spaced away from the elongate electrode 320.

Preferably, the wire electrode 502 for the elongate electrode 320 is the same as the wire electrode 524 for the revolving electrodes 328 and 329. For example, the wire electrode 524 may be caused to extend from the fifth guide roll 522 supported on the bearing stand 336 to the first guide roll 504 supported on the mandrel 314 via some guide rolls (not shown).

Rail receiving members 372 are provided through an insulator 368 on the bottom surface of the bearing stand 336 of the supporting device 335. Two rail receiving members 372 are provided on each of the two sides of the bottom surface of the bearing stand 336, and receive rails 376 provided on the upper surface of the base stand 374. One end of a driving rod is connected to the right side portion in FIG. 5 of the supporting device 335, and the other end of the driving rod 530 is linked to a driving device (not shown). As a result, the supporting device 335, and therefore the revolving electrodes 328 and 329, make a controlled reciprocating motion longitudinally, namely in the left-right direction in FIG. 5.

Four vertically extending rods 381 are fixed to the bottom surface of the base stand 374. These rods 381 are fitted in four sliding supporting portions 384 provided on a fixedly disposed frame 382, and as a result, maintain the base stand 374 horizontal when it moves vertically. One end of a driving rod 380 is further fixed to the base stand 374, and its other end is linked to a driving device (not shown). A spring 386 is disposed around the driving rod 380 and between the base stand 374 and the frame 382. Consequently, the base stand 374 makes a controlled vertical movement, and during welding, a pressure is generated by the action of the spring 386 between the elongate electrode 320 and the revolving electrodes 328 and 329.

The shafts 360 and 361 of the revolving electrodes 328 and 329 are connected respectively to an ac power supply through a feeder bearing (not shown), for example.

The apparatus in accordance with the third embodiment operates in the same way as the first and second embodiments described hereinabove. However, when the welding is carried out while the revolving electrodes 328 and 329 move along the elongate electrode 320, the lap portions 312 and 313 of the can bodies 310 and 311 are pressed between the wire electrodes 502 and 524. This serves to prevent damage to the elongate electrode 320 and the revolving electrodes 328 and 329 and to avoid poor welding which is due to the surface unevenness of these electrodes.

Figure 7:
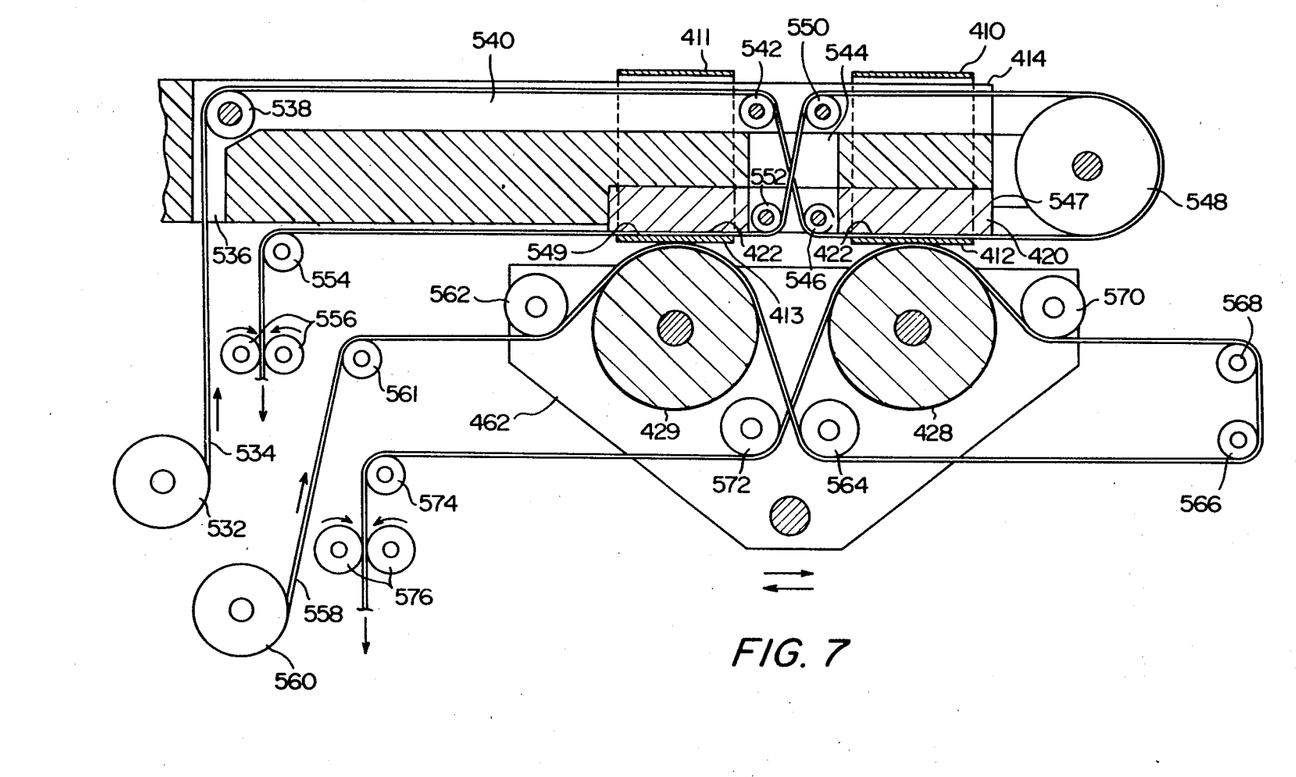
FIG. 7 is a partial sectional side elevation of a fourth embodiment of the apparatus of this invention.

Now, with reference to FIG. 7, a fourth embodiment of the apparatus of this invention will be described below in detail. This apparatus differs from the third embodiment in the manner of supplying the wire electrode. The following description, therefore, is directed mainly to this difference.

The apparatus in accordance with the fourth embodiment includes a wire electrode feed roll 532 rotatably mounted on a fixed frame. The feed roll 532 holds and feeds a wire electrode 534. The wire electrode 534 extends upwardly from the feed roll 532 through a first hole 536 provided in the mandrel 414, advances along a long channel 540 formed in the upper portion of the mandrel 414 via a first roll 538 rotatably mounted on the mandrel 414, and further advances into a gap between a first portion 547 of an electrode surface 422 of an elongate electrode 420 and the lap portion 412 of a first can body 410 via a second roll 542, a second hole 544 and a third roll 546. Then, it advances upwardly via a fourth roll 548 rotatably mounted on the mandrel 414, goes along the long channel 540, and advances between the second portion 549 of the electrode surface 422 of the elongate electrode 420 which is electrically coupled to the first portion 547 and the lap portion 413 of a second can body 411 via a fifth roll 550, the second hole 544 and a sixth roll 552. Finally, it reaches two driving rollers 556 via a roller 554 rotatably mounted on a fixed frame. The driving rollers 556 move the wire electrode 534 a distance slightly larger than the length of each of the lap portions 412 and 413 of the can bodies 410 and 411 (i.e., the height of the can body) while there is a clearance between the elongate electrode 420 and the revolving electrodes 428 and 429.

Likewise, a wire electrode 558 extends from a feed roll 560 to two driving rolls 576 via a first roll 561 mounted rotatably on a fixed frame, a second roll 562, over the second revolving electrode 429 adjacent the lap portion 413, between the revolving electrodes 428 and 429 and a third roll 564 mounted rotatably on a bearing stand 462, a fourth roll 566 and a fifth roll 568 rotatably mounted on a fixed frame, a sixth roll 570, over the first revolving electrode 428 adjacent the lap portion 412, between the revolving electrodes 428 and 429 and a seventh roll 572 rotatably mounted on the bearing stand 462, and an eighth roll 574 rotatably mounted on a fixed frame. This wire electrode 558 is driven in the same way as the aforesaid wire electrode 534.

In the apparatus in accordance with the fourth embodiment, the surface of each of the wire electrodes 534 and 558 which stands in proximity to the lap portion 413 of the second can body 411 differs from that surface which stands in proximity to the lap portion 412 of the first can body 410. For this reason, even when during welding of one can body, the facing surfaces of the wire electrodes 534 and 558 undergo deformation, this deformation can be prevented from affecting the welding of the other can body.

In the apparatus shown in FIG. 5, every time the welding is performed, the wire electrode should be moved by a length corresponding to the sum of the lengths of the two can bodies and the distance between the two can bodies, and that part of the wire electrode which is located between the two can bodies is not utilized. In contrast, in the apparatus in accordance with the fourth embodiment, the wire electrodes are moved by a length slightly larger than the length of the can body every time the welding is performed. Thus, almost all of both surfaces of the wire electrodes can be effectively used.

Now, referring to FIGS. 8 and 9, a fifth embodiment of the apparatus of this invention will be described in detail.

The apparatus in accordance with the fifth embodiment includes a fixed elongate electrode 632, two revolving electrodes 634 and 636, a bearing stand 638 supporting the two revolving electrodes 634 and 636, and an ac power supply 640.

Figures 8, 9:
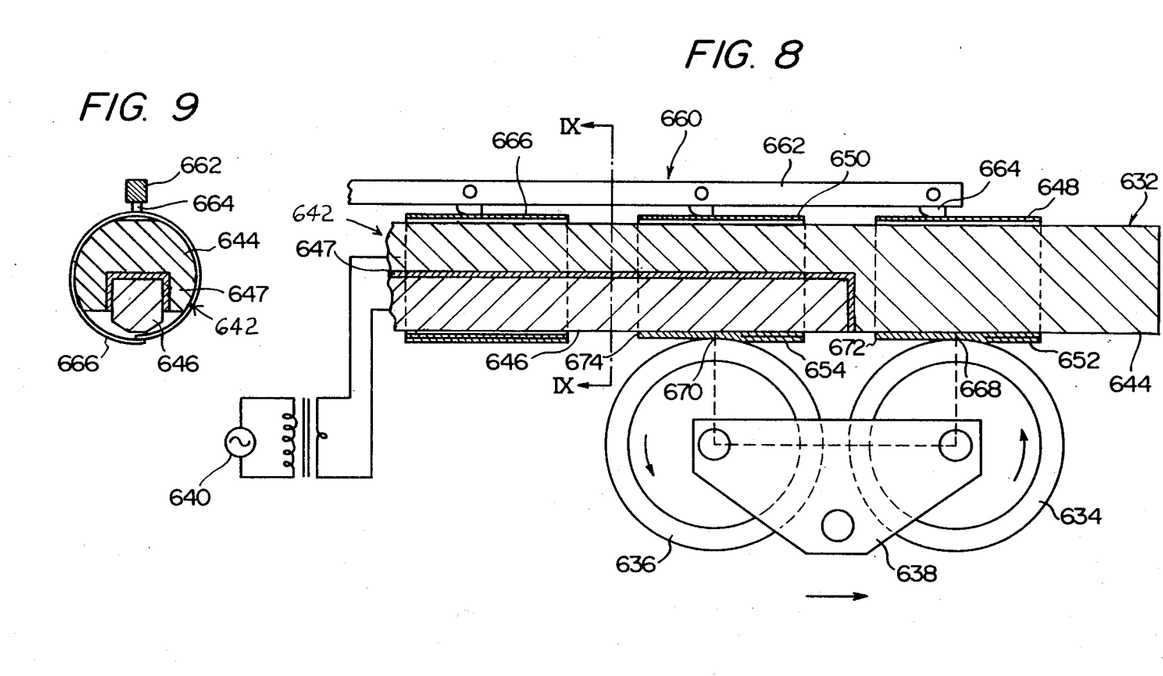
FIG. 8 is a partial sectional side elevation of a fifth embodiment of the apparatus of this invention.
FIG. 9 is a sectional view taken along line IX—IX of FIG. 8.

The fixed elongate electrode 632 is constructed as part of a mandrel 642, and the left side portion of the mandrel in FIG. 8 constitutes a can body maker (not shown). The fixed elongate electrode 632 includes a first conductor 644 and a second conductor 646. The first conductor 644 has formed therein a channel having a nearly rectangular cross section as shown in FIG. 9, and the second conductor 646 is fixedly disposed in this channel through an insulator 647. Accordingly, the first conductor 644 is electrically insulated from the second conductor 646. Furthermore, a can body fixing means (not shown) cooperating with the fixed elongate electrode 632 is provided so as to fixedly dispose can bodies at a first position, a second position, etc. on the fixed elongate electrode 632. In FIG. 8, a first can body 648 is set at a first position, and a second can body 650, at a second position. The can body fixing means may be constructed of the holding wings 24 shown in FIG. 1 or the like. The can bodies 648 and 650 are so arranged that when they are set at the first and second positions, their lap portions 652 and 654 are directed downwardly in FIG. 8. A first electrode surface 656 and a second electrode surface 658 are formed respectively on the lower ends (FIG. 8) of the first conductor 644 and the second conductor 646, respectively. These electrode surfaces 656 and 658 are formed as in the case of the electrode surface 22 shown in FIGS. 1 and 2.

The two revolving electrodes 634 and 636 are disposed below the fixed elongate electrode 632, and constructed in the same way as in the case of the revolving electrode 28 shown in FIGS. 1 and 2.

The two revolving electrodes 634 and 636 are rotatably mounted on the bearing stand 638, and are electrically coupled to each other through the bearing stand 638.

In this specific embodiment, the revolving electrodes 634 and 636 are disc-like. But their shape is not limited to this shape, and may, for example, be a part of a disc-like shape. The revolving electrodes 634 and 636 have a radius of curvature of at least 40 mm, and in particular, when can bodies made of tin-free steel are to be produced, their radius of curvature is preferably at least 50 mm.

A revolving electrode moving means (not shown) is linked to the bearing stand 638, and consequently, the two revolving electrodes 634 and 636 are adapted to move toward and away from the two electrode surfaces of the fixed elongate electrode 632 and longitudinally of the fixed elongate electrode 632, i.e. the left-right direction in FIG. 8. The revolving electrode moving means may be constructed of members similar to the bottom plate 58 of the bearing stand 36, the supporting rod 40, the sliding plate 42, the pressing spring 44, the guide 48, the linking rod 52, the pin 54, and the projecting portion 56 shown in FIGS. 1 and 2.

An ac power supply 640 is electrically coupled to the first conductor 644 and the second conductor 646 of the fixed elongate electrode 632. When the circuit is closed, this ac power supply 640 feeds an ac current having a rms value of 3 to 9 KA with a frequency of 200 to 500 Hz.

The apparatus in accordance with the fifth embodiment further includes a can body moving means 660 having a feeding rod 662 and claws 664. The feeding rod 662 and the claws 664 function in the same way as the feeding rod 16 and the claws 18 shown in FIGS. 1 and 2. The claws 664 are adapted to be lifted when pressed from below, and return elastically to their original positions when released from pressure. Can bodies can therefore be moved successively to the right in FIG. 8 by reciprocating the feeding rod 664 in the left-right direction in FIG. 8 and intermittently fixing the can bodies at predetermined positions.

The operation of the apparatus in accordance with the fifth embodiment will be described.

First, a thin can body blank, for example a tin-free steel (electrolytically chromate-treated steel plate), a tin plate or a nickel-plated steel plate having a thickness of 0.12 to 0.6 mm, preferably 0.15 to 0.4 mm, is fed to a can body maker disposed on the left hand side in FIG. 8. By the can body maker, this thin meal blank is fabricated into a cylindrical form having a lap portion width of 0.1 to 1.0 mm, preferably 0.2 to 0.8 mm.

Can bodies so made are moved successively from left to right in FIG. 8 by means of the feeding rod 662, etc. The can bodies 648, 650 and 666 are in condition for free movement over the fixed elongate electrode 632. By the engagement of the claws 664 with the left ends of the can bodies 648, 650 and 666, these can bodies are moved to the right. The amount of movement of these can bodies corresponds to the distance which the third can body 666 at the left end in FIG. 8 travels until it reaches the position of the first can body 648 at the right end in FIG. 8. When the feeding rod 662 moves from right to left, the can bodies 648, 650 and 666 are fixedly set at the fixed elongate electrode 632 by the can body fixing means (not shown). Thus, when the feeding rod 662 moves from right to left, the claws 664 are lifted by the can bodies 648, 650 and 666 and slide over the upper surfaces of these can bodies. After movement as described above, the first can body 648 is fixed set at a first position, and the second can body 650 at a second position, as shown in FIG. 8, by the can body fixing means (not shown).

Thereafter, the revolving electrodes 634 and 636 are moved by the revolving electrode moving means (not shown) from positions away from the fixed elongate electrode 632 to such positions that the upper end 668 of the first revolving electrode 634 (FIG. 8) is located in proximity to the first electrode surface 656 of the fixed elongate electrode 632 and slightly on the left of the left side end 672 of the first can body 648 (FIG. 8), and the upper end 670 of the second revolving electrode 636 (FIG. 8) is located in proximity to the second electrode surface 658 of the fixed elongate electrode 632 and slightly to the left of the left side end 674 of the second can body 650 (FIG. 8). Then, the first and second revolving electrodes 634 and 636 are moved to the right in FIG. 8.

As a result of this movement, the left side end 672 of the first can body 648 is electrically coupled to the first revolving electrode 634, and simultaneously, the left side end 674 of the second can body 650 is electrically coupled to the second revolving electrode 636. Thus, one terminal of the ac power supply 640 is electrically coupled to the other terminal of the ac power supply 640 via the first conductor 644 and the first electrode surface 656 of the fixed elongate electrode 632, the first can body 648, the first revolving electrode 634, the second revolving electrode 636, the second can body 650 and the second electrode surface 658 and the second conductor 646 of the fixed elongate electrode 632. An ac current is intermittently applied by the opening and closing of a switch (not shown). Application of the ac current is usually started just before the revolving electrodes 634 and 636 reach the left side ends 672 and 674 of the can bodies 648 and 650. As a result, an ac current having a rms value of 3 to 9 KA with a frequency of 200 to 500 Hz flows.

When the first and second revolving electrodes 634 and 636 further move to the right in FIG. 8, the distance between the top portion 668 of the first revolving electrode 634 and the first electrode surface 656 of the elongate electrode and the distance between the top portion 670 of the second revolving electrode 636 and the second electrode surface 658 of the elongate electrode become smaller than the thicknesses of the lap portions 652 and 654 of the can bodies 648 and 650, respectively. Accordingly, the first and second revolving electrodes 634 and 636 rotate while pressing the lap portions 652 and 654. The welding force applied by the revolving electrodes is generally 30 to 500 kg, preferably 40 to 200 kg. The speed of moving of the revolving electrodes 634 and 638 to the right is 30 to 70 m/min.

When the first and second revolving electrodes 634 and 636 further moves to the right, their top portions 634 and 636 reach the right side ends of the can bodies 648 and 650, respectively, and then leave there. The moment the revolving electrodes 634 and 636 have left the right side ends of the can bodies 648 and 650, the applied ac current is cut off by a switch (not shown).

The can body fixing means is then rendered inoperative, and the can bodies are moved a predetermined distance to the right in FIG. 8 by the feeding rods 662 and the claws 664. Specifically, the first and second can bodies 648 and 650 are removed from the right ends of the fixed elongate electrode 632, and the third can body 666 is moved to the position previously occupied by the first can body 648, and a fourth can body (not shown) located to the left of the third can body 666 is moved to the position previously occupied by the second can body 650. Thereafter, by the procedure described hereinabove, the third and fourth can bodies are fixedly set on the fixed elongate electrode 632 and their lap portions are welded.

In the fifth embodiment, the revolving electrodes 634 and 636 revolve in the right hand direction in FIG. 8. It is possible, if desired, to construct them so that they can revolve alternately in the right hand direction and the left hand direction.

Now, a sixth embodiment of the apparatus of this invention will be described with reference to FIGS. 10 to 12.

The apparatus in accordance with the fixth embodiment differs from the apparatus of the fifth embodiment in that it uses wire electrodes and a mechanism for cooling the elongate electrode similar to the embodiment of FIGS. 5 and 6. The following description is directed mainly to these different features.

A fixed elongate electrode 732 used in this embodiment includes a first guide roll 684 for a wire electrode 682, a lower guide channel 686, a second guide roll 688 and an upper guide channel 690. The wire electrode 682 is obtained, for example, by flattening a round copper or tin-plated copper wire having a diameter of about 1.5 mm. The first guide roll 684 is rotatably supported on a second conductor 746, and the second guide roll 688 is rotatably supported by a first conductor 744. The wire electrode 682 is moved a predetermined amount in the longitudinal direction by a driving mechanism (not shown) when two revolving electrodes 734 and 736 are at positions spaced away from the fixed elongate electrode 732.

Figures 10, 11, 12:
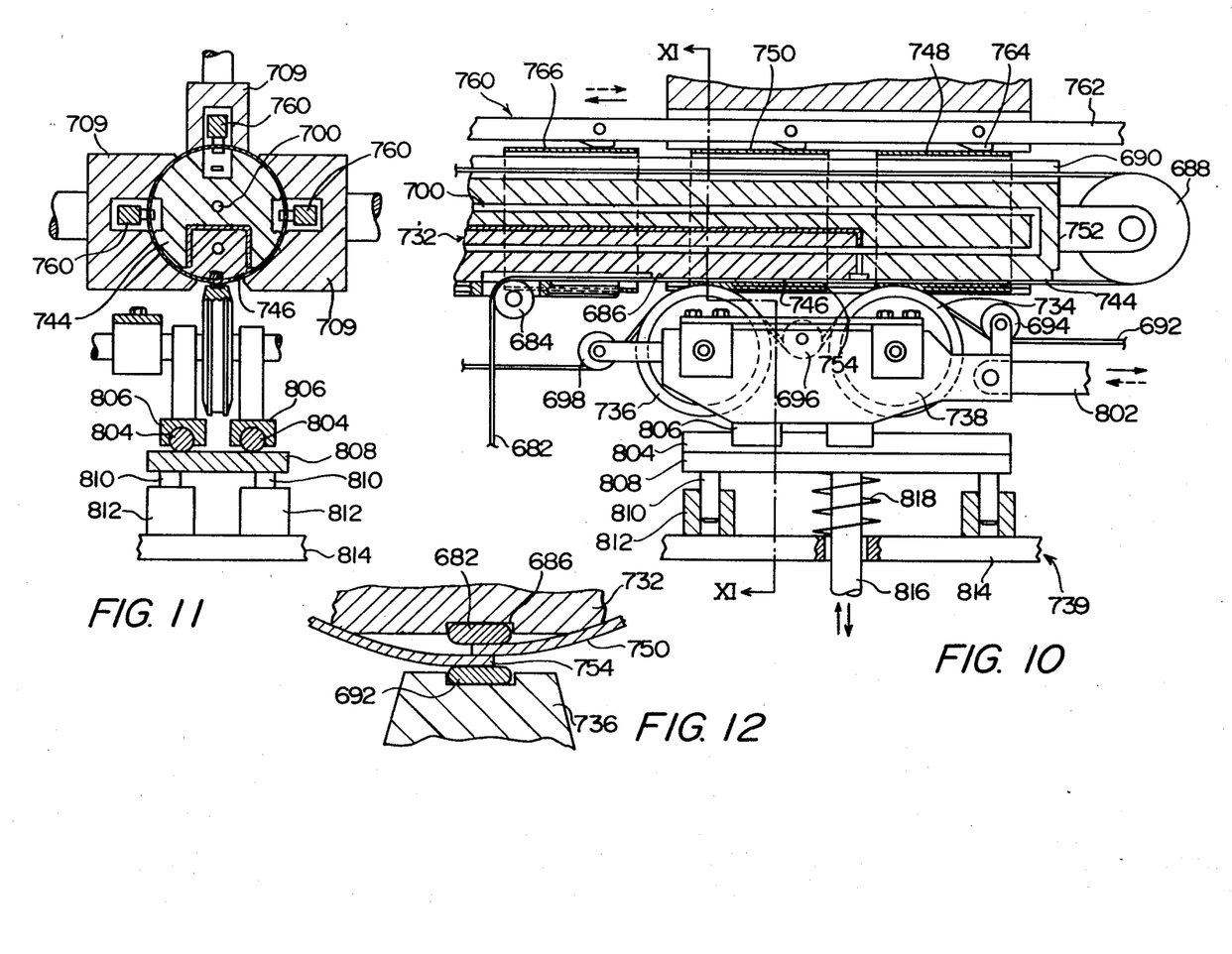
FIG. 10 is a partial sectional side elevation of a sixth embodiment of the apparatus of this invention.
FIG. 11 is a sectional view taken along line XI—XI of FIG. 10.
FIG. 12 is a partial enlarged view of FIG. 11.

As FIG. 10 shows, a supporting device 738 supporting the two revolving electrodes 734 and 736 further rotatably supports a third guide roll 694, a fourth guide roll 696 and a fifth guide roll 698 for another electrode wire 692. The revolving electrodes 734 and 736 have formed therein a guide channel for guiding the wire electrode 692. Thus, as shown in FIG. 10, the wire electrode 692 extends via the third guide roll 694, the first revolving electrode 734, the fourth guide roll 696, the second revolving electrode 736 and the fifth guide roll 698, and is moved a predetermined amount in the longitudinal direction when the two revolving electrodes 734 and 736 are located at positions spaced away from the fixed elongate electrode 732.

Preferably, the wire electrode 682 for the fixed elongate electrode 732 is the same as the wire electrode 692 for the revolving electrodes 734 and 736. Specifically, the wire electrode 692 may be constructed such that it extends from the fifth guide roll 698 supported on the supporting device 738 to the first guide roll 684 supported on the first conductor 744 via some guide rolls (not shown).

In the sixth embodiment, the apparatus further comprises a cooling hole 700 for conducting a cooling fluid which is formed in the fixed elongate electrode 732. As FIGS. 10 and 11 show, the cooling hole 700 extends through the first conductor 744 and the second conductor 746. The cooling fluid may, for example, be cooling water, brine (for example, at −30° C.), or liquefied Freon.

Furthermore, as shown in FIG. 11, can bodies 748, 750 and 766 are moved on the fixed elongate electrode 732 in the longitudinal direction (the right hand direction in FIG. 10) by three can body moving means 760 each consisting of a feeding rod 762 and claws 164, and are fixed at predetermined positions by three holding wings 709.

The revolving electrode moving device 739 illustrated in FIGS. 10 and 11 includes a lever 802 for lateral movement, two rails 804 having a nearly circular cross section, four rail-receiving members 806, a supporting plate 808, four projecting rods 810, four projecting rod receiving members 812, a supporting stand 814, a driving rod 816 and a coil spring 818.

The lateral movement lever 802 is connected to the supporting device 738 supporting the revolving electrodes 734 and 736 and to a driving device (not shown), and moves the supporting device 738, and therefore the revolving electrodes 734 and 736, in the lateral direction (the left-right direction in FIG. 10).

The four rail-receiving members 806 are fixed to the supporting device, and the two rails 804 are fixed to the supporting plate 808. Thus, the supporting device 738 can move longitudinally of the rails 804 with respect to the supporting plate 808.

The four projecting rods 810 which extend downwardly are secured to the supporting plate 808, and the four projecting rod-receiving members 812 are fixed to the supporting stand 814. The projecting rods 810 are fitted respectively in the corresponding projecting rod-receiving members 812. With this structure, the supporting plate 808 can move in the longitudinal direction (the up-and-down direction in FIG. 10) while being maintained parallel to the supporting stand 814.

The driving rod 816 is connected to the supporting plate 808 and a driving device (not shown), and moves the supporting plate 808 longitudinally. The coil spring 818 is disposed around the driving rod 816 and between the supporting plate 808 and the supporting stand 814, and urges the supporting plate 808 upwardly in FIG. 10.

Because of the aforesaid structure, the revolving electrode moving device 739 can be moved along a desired path by the lateral movement of the lever 802 and the longitudinal movement of the driving rod 816, while the supporting device 738 is maintained parallel to the fixed elongate electrode 732. As a result, as in the aforesaid embodiment, the revolving electrodes 734 and 736 can be moved with respect to the fixed elongate electrodes 732.

The apparatus in accordance with the sixth embodiment operates in the same way as the apparatus in accordance with the fifth embodiment. But as shown clearly in FIG. 12, when the welding is performed while the revolving electrodes 734 and 736 are in proximity to the fixed elongate electrode 732, the lap portions 752 and 754 of the can bodies 748 and 750 are pressed between the wire electrodes 682 and 692. Accordingly, the apparatus of the sixth embodiment can avoid poor welding ascribed to damages or depressions in the electrodes more effectively than the apparatus in accordance with the fifth embodiment.

In the first to sixth embodiments described hereinabove, the elongate electrode is fixed and disposed inwardly of the can bodies, and the revolving electrodes which revolve with the movement of their axes of rotation are disposed outwardly of the can bodies. If desired, it is possible to make the elongate electrode movable and dispose it outwardly of the can bodies, and to rotate the revolving electrodes without movement of their axes of rotation and dispose them inwardly of the can bodies.

In the above embodiments, the first and second revolving electrodes are fixed to each other, and adapted to exert a welding force by one pressurizing system such as a spring. If desired, welding forces can be separately applied to the first and second can bodies by providing one pressurizing system for each of the two revolving electrodes. For example, by providing two parallel-laid sets of the revolving electrode 28 and the pressing spring 44 shown in FIG. 2 and using the sliding plate 42 in common, welding forces can be exerted on the first and second can bodies by separate springs. By providing one pressurizing system for each revolving electrode, the welding forces on the first and second can bodies can be made more uniform, and the welded states of the two can bodies can be made uniform.

According to the apparatus of this invention, two can bodies can be welded by using two revolving electrodes. For rapid welding, it may be possible to weld one can body using two revolving electrodes. With this method, however, the welded state of that part of the lap portion of the can body which first comes into contact with the revolving electrode becomes different from the welded states of the other parts, and poor welding results. When the welded can body is taken out, the revolving electrodes must be kept away from the elongate electrode, and when the can body is welded, the revolving electrodes should be kept in proximity to the elongate electrode. In the welding of one can body by using two revolving electrodes, one of the revolving electrodes is necessarily located over the lap portion of the can body when the two revolving electrodes are kept in proximity to the elongate electrode. The welding force becomes unstable in this positional relationship. If a welding current is passed when the welding force is unstable, the welded state of that part becomes unstable, and poor welding tends to result with the occurrence of splashes, weakening of the weld strength, etc. Conversely, if no welding current is passed when the welding force is unstable, that part of the lap portion is deformed by the welding force. When, thereafter, the other revolving electrode welds that part, the welded state of that part becomes different from the other part, and poor welding tends to result.

According to this invention, when two revolving electrodes are maintained in proximity to the elongate electrode prior to welding two can bodies at the same time, the lap portions of the can bodies do not exist between the revolving electrodes and the elongate electrode. Hence, the poor welding can be avoided.

What is claimed is:

1. An apparatus for producing welded metallic can bodies by welding unwelded metallic can bodies made of a surface treated steel plate and each having an overlapped portion by using a mash seam welding technique at the overlapped portions, said apparatus comprising:
    an elongate electrode having an electrode surface of a shape corresponding to the shape of the overlapped portion of each can body;
    two revolving electrodes having rotating shafts with said shafts being spaced along said elongate electrode parallel to said elongate electrode said revolving electrodes being opposed to said elongated electrode to revolve on the overlapped portions of two can bodies when the can bodies are disposed on the electrode surface of the elongate electrode;
    electrical insulating means electrically insulating said revolving electrodes from each other;
    means for placing the two unwelded can bodies on the electrode surface of the elongate electrode with the can bodies spaced from each other and the distance between the corresponding ends of the two can bodies equal to the spacing of the rotating shafts of said revolving electrodes;
    means for moving said two revolving electrodes synchronously along the overlapped portions of the can bodies while they revolve on the overlapped portions;
    means connected to said revolving electrodes for pressing them against the overlapped portions of the can bodies; and
    feeder means for electrically coupling said two revolving electrodes across an alternating current power supply, whereby when the two revolving electrodes are revolving on the overlapped portions of the two can bodies, one terminal of the alternating current power supply is electrically coupled to the other terminal of the alternating current power supply only through the feeder means, one of said revolving electrodes, the overlapped portion of one can body, said elongate electrode, the overlapped portion of the other can body, the other revolving electrode and said feeder means.

2. The apparatus of claim 1 wherein the feeder means includes a feeder bearing for electrically coupling the shafts of the respective revolving electrodes to the ac power supply.

3. The apparatus of claim 1 wherein the feeder means includes feeder rotors electrically coupled to the revolving electrodes and fixed to the shafts of the revolving electrodes and a feeder plate provided in proximity to the feeder rotor and electrically coupled to the ac power supply.

4. The apparatus of claim 3 wherein the feeder means includes two feeder rotors electrically coupled respectively to the two revolving electrodes and fixed to the the shafts of the revolving electrodes and a feeder plate having a first and a second portion disposed in proximity to the two feeder rotors respectively and electrically connected to the two terminals of the ac power supply.

5. The apparatus of claim 1 wherein the elongate electrode includes a wire electrode located in proximity to the overlapped portions of the can bodies, and the revolving electrodes include a further wire electrode located in proximity to the overlapped porions of the can bodies.

6. An apparatus for producing welded metallic can bodies by welding unwelded metallic can bodies made of a surface treated steel plate and each having an overlapped portion by using a mash seam welding technique at the overlapped portions, said apparatus comprising:
    an elongate electrode having an electrode surface of a shape corresponding to the shape of the overlapped portion of each can body, said electrode being divided into two portions spaced along the length thereof and electrically insulated from each other and each having a length at least as long as the can bodies;
    two revolving electrodes having rotating shafts with said shafts being spaced along said elongate electrode parallel to said elongate electrode and being electrically connected, said revolving electrodes being opposed to the respective portions of said elongated electrode to revolve on the overlapped portions of two can bodies when the can bodies are disposed on the electrode surface of the elongate electrode;
    means for placing the two unwelded can bodies on the electrode surface of the elongate electrode with one can body on each of said electrode portions and the can bodies spaced from each other and the distance between the corresponding ends of the two can bodies equal to the spacing of the rotating shafts of said revolving electrodes;
    means for moving said two revolving electrodes snychronously along the overlapped portions of the can bodies while they revolve on the overlapped portions;
    means connected to said revolving electrodes for pressing them against the overlapped portions of the can bodies; and
    feeder means for electrically coupling said two electrode portions across an alternating current power supply, whereby when the two revolving electrodes are revolving on the overlapped portions of the two can bodies, one terminal of the alternating current power supply is electrically coupled to the other terminal of the alternating current power supply only through the feeder means, one of said electrode portions, the overlapped portion of one can body, said revolving electrodes, the overlapped portion of the other can body, the other electrode portion and said feeder means.

7. The apparatus of claim 6 wherein the elongate electrode is stationary, and each of said revolving electrodes is a disc-like electrode which rotates while its axis of rotation moves.

8. The apparatus of claim 6 wherein the elongate electrode includes a wire electrode located in proximity to the overlapped portions of the can bodies, and the revolving electrodes include a further wire electrode located in proximity to the overlapped portions of the can bodies.

9. The apparatus of claim 7 wherein the elongate electrode includes a wire electrode located in proximity to the overlapped portions of the can bodies, and the revolving electrodes include a further wire electrode located in proximity to the overlapped portions of the can bodies.

* * * * *